United States Patent [19]

Cobern

[11] Patent Number: 4,647,853
[45] Date of Patent: Mar. 3, 1987

[54] MUD TURBINE TACHOMETER

[75] Inventor: Martin E. Cobern, Cheshire, Conn.

[73] Assignee: Teleco Oilfield Services Inc., Meriden, Conn.

[21] Appl. No.: 537,821

[22] Filed: Sep. 30, 1983

[51] Int. Cl.$^4$ .............. E21B 25/16; E21B 47/02; G01P 3/52

[52] U.S. Cl. .................. 324/166; 324/346; 324/167; 324/173; 324/174; 175/45

[58] Field of Search .......... 73/505, 509; 175/45; 33/362; 324/346, 160, 163, 166, 167, 173, 174, 179

[56] References Cited

U.S. PATENT DOCUMENTS

| | | |
|---|---|---|
| 2,940,039 | 6/1960 | Yost . |
| 3,400,327 | 9/1968 | Sexton .................. 324/346 |
| 3,611,813 | 10/1971 | Brocker . |
| 3,667,042 | 5/1972 | Engel . |
| 4,013,945 | 5/1975 | Grosso . |
| 4,013,946 | 3/1977 | Lewis ..................... 33/362 |
| 4,283,679 | 8/1981 | Ito . |
| 4,316,144 | 2/1982 | Levijoki . |
| 4,372,398 | 2/1983 | Kuckes .................. 175/45 |

FOREIGN PATENT DOCUMENTS

| | | | |
|---|---|---|---|
| 1298343 | 6/1962 | France .................. 73/505 |
| 55-99016 | 7/1980 | Japan .................... 33/362 |

Primary Examiner—Reinhard J. Eisenzopf
Assistant Examiner—Jose M. Solis
Attorney, Agent, or Firm—Fishman & Dionne

[57] ABSTRACT

In an MWD measurement system, the speed of rotation of a downhole turbine is measured by the interaction of a triaxial magnetometer in a sensor package and a permanent magnet attached to the turbine shaft. The triaxial magnetometer may be part of an existing MWD system for measuring borehole directional parameters. The magnet is a strong magnet mounted on the turbine shaft perpendicular to the axis of the turbine and the axis of the drill string.

32 Claims, 10 Drawing Figures

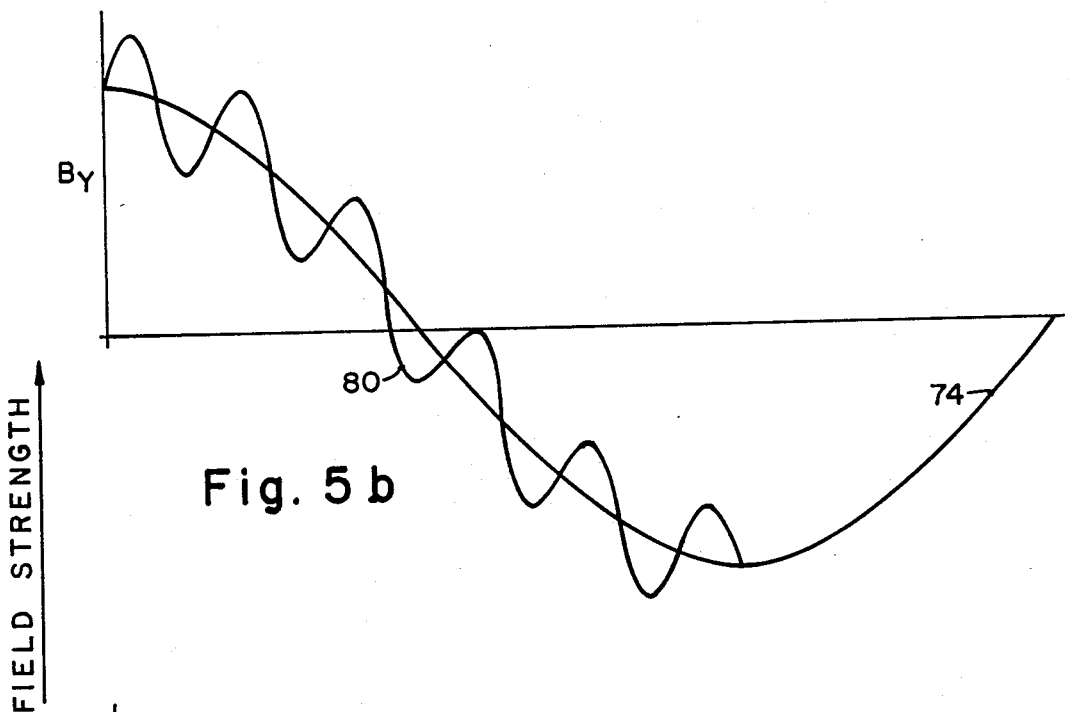
Fig. 5c
Fig. 5b
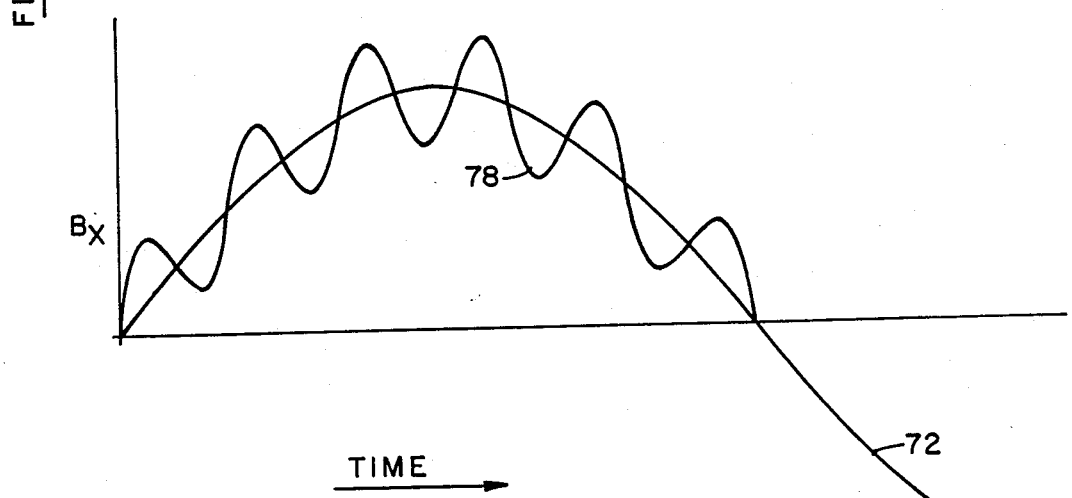
Fig. 5a

MUD TURBINE TACHOMETER

BACKGROUND OF THE INVENTION

This invention relates to the field of measurement while drilling (MWD) and borehole telemetry. More particularly, this invention relates to measurement downhole of the speed of rotation of a rotating unit, such as a turbine, and transmitting the measured speed parameter to the surface.

In the field of borehole drilling, particularly oil and gas well drilling, the usefulness of systems capable of detecting parameters at the bottom of the drill string and transmitting such data to the surface during the course of drilling has long been recognized. Mud pulse telemetry systems are known and in commercial use for measuring while drilling. Such systems are shown, for example, in U.S. Pat. Nos. 3,982,431; 4,013,945 and 4,021,774, all of which are assigned to the assignee hereof.

One method of well drilling involves driving a drill bit with a downhole turbine which is powered by the drilling mud which circulates in the drill string and in the anulus between the drill string and the wall of the well. These drilling systems are very efficient and are highly desirable for use in straight drilling. However, in order to be effective, the turbine in these systems must be operated within a narrow rotational speed range for optimum power output. Thus, it is important to be able to regulate the speed of the turbine; but regulation cannot be accomplished without knowing the actual speed at which the drill is rotating.

This requirement for and regulating the speed of a drill is, of course, only one example of situations in which it may be desirable to know the speed of rotation of a turbine or other downhole equipment.

SUMMARY OF THE INVENTION

The present invention provides apparatus and a method for determining the rotational speed of a downhole mud turbine. This information may then be transmitted to the surface to be used by the driller to control the rate of rotation of the turbine and hence optimize the drilling rate of the drill. The rotation rate of the drill bit which is driven by the turbine cannot be inferred from surface measurements. Therefore, it is necessary to have a system which can measure the rotation rate downhole and transmit this information to the surface. It is, of course, also important that any such system for measuring the downhole speed of the turbine not interfere with normal drilling operations or other downhole measurements, and it should also not require extensive modification of the turbine.

These objectives are met by the present invention wherein a turbine rotation sensor apparatus and method are provided to interact with an already existing MWD downhole sensing and telemetry system. That already existing system uses triaxial magnetometers and accelerometers to determine the orientation of the bottom hole assembly (BHA) of the drill string, i.e., the deviation of the BHA from the vertical (inclination angle), its compass orientation (azimuth) and its orientation about its axis (tool face or reference angle). That existing system employs mud pulse telemetry to communicate these directional parameters from downhole to the surface. That presently existing system is one which is in commercial use by Teleco Oilfield Services Inc., the assignee of the present invention.

In accordance with the present invention, a compact, powerful permanent magnet is mounted on the uphole end of a turbine drive shaft, with the magnetic moment of the magnet perpendicular to the axis of the turbine shaft. As the turbine shaft rotates, this turbine mounted magnet superimposes a rotating magnetic field on the earth's magnetic field in the vicinity of the turbine. Also in accordance with the present invention, this superimposed magnetic field is sensed by the triaxial magnetometers in the sensing system, and the sensed data is transmitted to the surface as a signal commensurate with speed of rotation of the turbine and the drill being driven by the turbine. If the drill string between the turbine and the triaxial magnetometer sensors is straight, the superimposed magnetic field will be transverse, i.e., will have only x and y components and will affect only the x and y magnetometers. If there is a "bent sub" between the turbine and the sensor, then there will also be a z component of the superimposed magnetic field which will affect the z magnetometer as well. Any superimposed magnetic field components will vary with a frequency equal to the rotation rate of the turbine. As used in the preceeding discussion and hereinafter, the "z" direction is the direction of the axis of the drill string (and the axis of the turbine shaft in a straight BHA) and the x and y axes are mutually perpendicular axes perpendicular to the z axis.

The superimposed rotating magnetic field constitutes a tachometric signal; and the intensity of this tachometric signal will be a small fraction of the intensity of the earth's field. Hence, it is necessary to high pass filter the superimposed signals to eliminate the earth's field and amplify them before processing. This processing need only determine the frequency of the signal, since the frequency of this signal is commensurate with turbine speed. Any one of several processing techniques, such as analog or digital frequency counting or Fast Fourier Transformation (FFT) may be used for such processing. Conversely, the magnetometer outputs can be passed through a low pass filter for determination of the normal directional parameters without perturbation or disturbance resulting from the superimposed magnetic field.

The many features and advantages of the present invention will be apparent to and understood by those skilled in the art from the following detailed description and drawings.

BRIEF DESCRIPTION OF THE DRAWINGS

Referring to the drawings, wherein like elements are numbered alike in the several FIGURES:

FIGS. 5A, 5B and 5C are plots of unfiltered outputs of the x, y and z magnetometers during straight hole drilling in which the drill string rotates slowly.

DESCRIPTION OF THE PREFERRED EMBODIMENT

Figure 1:
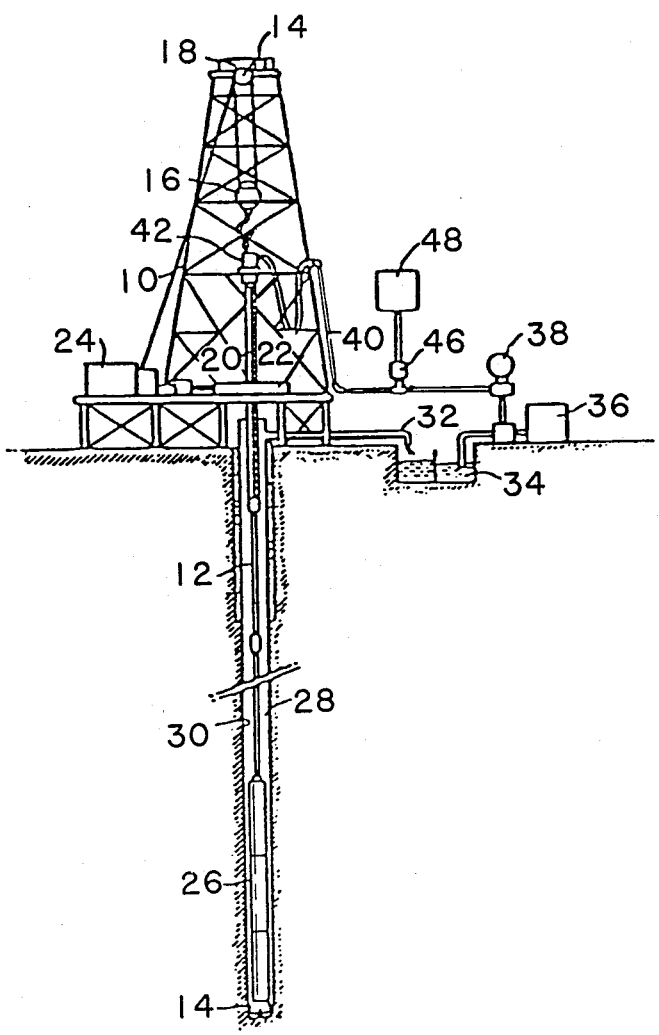
FIG. 1 is a generalized schematic view of a borehole and drilling derrick showing the environment for the present invention.
Figures 2, 3:
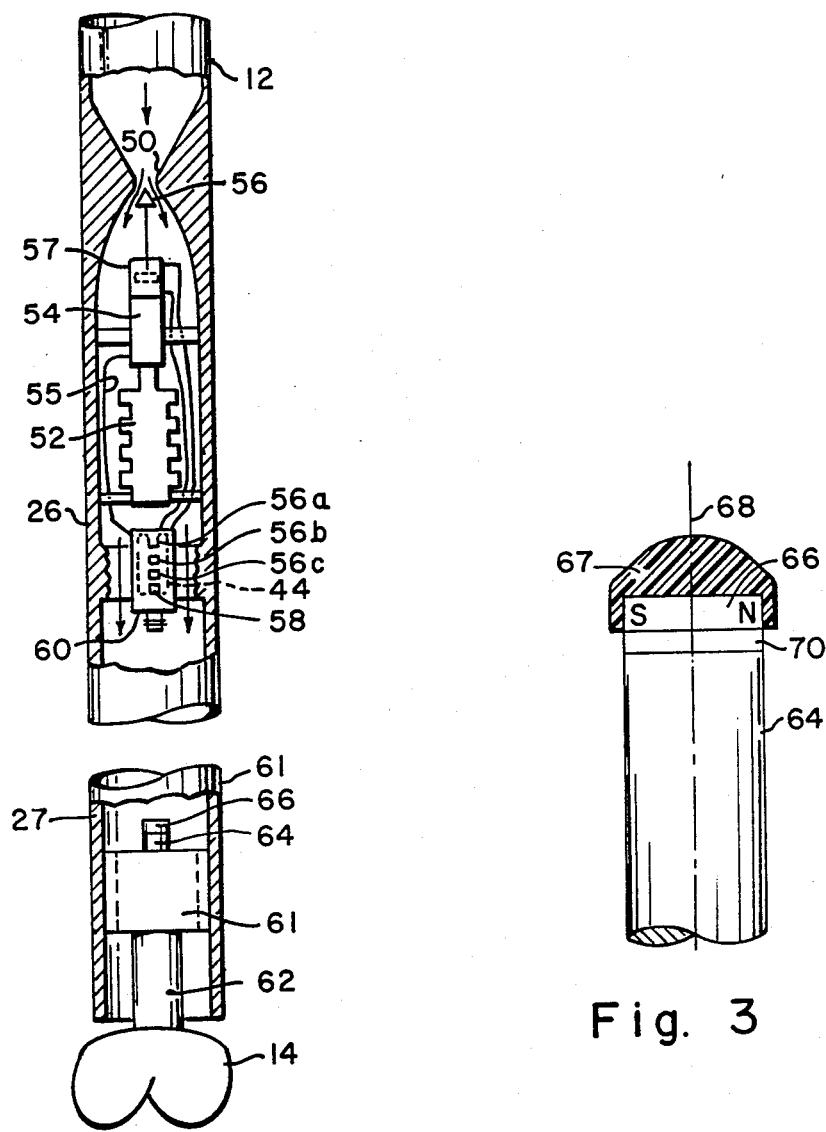
FIG. 2 is a view of a section of the drill string of FIG. 1 showing, in schematic form, the drill string environment of the present invention.
FIG. 3 is a partial view of the uppermost end of the turbine shaft with a magnet mounted thereon in accordance with the present invention.

Referring first to FIGS. 1 and 2, the general environment is shown in which the present invention is employed. It will, however, be understood that these generalized showings are only for purposes of showing a representative environment in which the present invention may be used, and there is no intention to limit applicability of the present invention to the specific configuration of FIGS. 1 and 2.

The drilling apparatus shown in FIG. 1 has a derrick 10 which supports a drill string or drill stem 12 which terminates in a drill bit 14. As is well known in the art, the entire drill string may rotate, or the drill string may be maintained stationary and only the drill bit rotated, which latter is the environment of the present invention. The drill string 12 is made up of a series of interconnected segments, with new segments being added as the depth of the well increases. In systems where the drill bit is turbine driven, it is often desirable to slowly rotate the drill string. That can be accomplished by reactive torque from the drilling, or by actual rotation of the drill string from the surface. To that latter end, the drill string is suspended from a movable block 16 of a winch 18, and the entire drill string may be driven in rotation by a square kelly 20 which slidably passes through but is rotatably driven by the rotary table 22 at the foot of the derrick. A motor assembly 24 is connected to both operate winch 18 and rotatably drive rotary table 22.

The lower part of the drill string may contain one or more segments 26 of larger diameter than other segments of the drill string (known as drill collars). As is well known in the art, these drill collars may contain sensors and electronic circuitry for sensors, and power sources, such as mud driven turbines which drive drill bits and/or generators and, to supply the electrical energy for the sensing elements.

Drill cuttings produced by the operation of drill bit 14 are carried away by a large mud stream rising up through the free annular space 28 between the drill string and the wall 30 of the well. That mud is delivered via a pipe 32 to a filtering and decanting system, schematically shown as tank 34. The filtered mud is then sucked by a pump 36, provided with a pulsation absorber 38, and is delivered via line 40 under pressure to a revolving injector head 42 and thence to the interior of drill string 12 to be delivered to drill bit 14 and the mud turbine if a mud turbine is included in the system.

The mud column in drill string 12 also serves as the transmission medium for carrying signals of downhole parameters to the surface. This signal transmission is accomplished by the well known technique of mud pulse generation whereby pressure pulses are generated in the mud column in drill string 12 representative of sensed parameters down the well. The drilling parameters are sensed in a sensor unit 44 (see FIG. 2) in a drill collar 26 near or adjacent to the drill bit. Pressure pulses are established in the mud stream within drill string 12, and these pressure pulses are received by a pressure transducer 46 and then transmitted to a signal receiving unit 48 which may record, display and/or perform computations on the signals to provide information of various conditions down the well.

Referring briefly to FIG. 2, a schematic system is shown of a drill string segment 26 in which the mud pulses are generated. The mud flows through a variable flow orifice 50 and is delivered to drive a first turbine 52. This first turbine powers a generator 54 which delivers electrical power to the sensors in sensor unit 44 (via electrical lines 55). The output from sensor unit 44, which may be in the form of electrical or hydraulic or similar signals, operates a plunger 56 which varies the size of variable orifice 50, plunger 56 having a valve driver 57 which may be hydraulically or electrically operated. Variations in the size of orifice 50 create pressure pulses in the mud stream which are transmitted to and sensed at the surface to provide indications of various conditions sensed by sensor unit 44. Mud flow is indicated by the arrows.

Since sensors in sensor unit 44 are magnetically sensitive, the particular drill string segment 26 which houses the sensor elements must be a non-magnetic section of the drill string, preferably of stainless steel or monel. Sensor unit 44 is further encased within a non-magnetic pressure vessel 60 to protect and isolate the sensor unit from the pressure in the well.

While sensor unit 44 may contain other sensors for directional or other measurement, it will contain a triaxial magnetometer with three windings, those windings being shown separately, merely for purposes of illustration and description, as windings 56A, 56B and 56C, being respectively the "x", "y" and "z" magnetometer windngs. Sensor unite 44 may also have a rotation sensor 58, which will be discussed in more detail hereinafter, and which may be the rotation sensor 58 of U.S. Pat. No. 4,013,945, the entire contents of which are incorporated herein.

A drilling turbine 61 is positioned below sensor assembly 44. Frequently, another segment 27 of nonmagnetic drill collar extends between sensor assembly 44 and turbine 61.

The shaft of drilling turbine 61 has a lower or downwardly extending section 62 which is connected to and drives drill bit 14 and an upwardly extending section 64. A strong permanent bar magnet 66 is mounted on the top of turbine shaft section 64.

As best seen in FIG. 3, magnet 66 is mounted flush to the top of turbine shaft 64, and it is essential to the present invention that magnet 66 be mounted perpendicular to the axis 68 of turbine shaft section 64, and the magnet must also be symmetrically positioned relative to axis 68. When so mounted, this apparatus, including the magnet, has two planes of symmetry, both of which include the shaft axis. One plane (in the plane of the paper) contains the north/south axis of the magnet, and the other plane (perpendicular to the plane of the paper) bisects the magnet. This symmetry, together with the continuity condition for magnetic field lines emanating from the magnet ensures that the field induced by the magnet will have no component along the shaft axis.

In order to isolate magnet 66 from turbine shaft 64 (which will likely be a ferrous or other permeable material) magnet 66 is actually mounted on and spaced from shaft 64 by a non-magnetic insulating barrier 70, which may be any suitable nonpermeable material such as inconel, plastic, etc. Magnet 66 must be an intense permanent magnet (having an energy product on the order of 15–20 megagauss-oersteds) which is not subject to demagnetization from shock, temperature, vibration and long term rotation within the earth's magnetic field.

The magnet must be suitable for use in an environment of high temperature (around 150° C.) and vibration. Also, it may be desirable to enclose the magnet in a protective casing with a streamlined profile and containing a shock absorbing potting compound 67.

Preferably, magnet 66 will be a rare earth magnet, such as a rare earth-cobalt magnet available from RECOMA, Inc. of Fairfield, N.J. Such magnets are known for their high level of magnetization, their resistance to demagnetization.

In the regular operation of sensor unit 44 (i.e., without considering the effects of magnet 66), the "x", "y" and "z" magnetometer windings 56A, 56B and 56C will sense and generate signals commensurate with the x, y and z components of the earth's magnetic field. If the drill string is stationary, these x, y and z component outputs will be constant values. However, a typical practice in straight line turbine drilling is to cause or permit the drill string to rotate slowly (usually at a rate of less than 100 rpm). In that event, the x and y magnetometer outputs will be sinusoidal and out of phase by 90°. A representative plot of that latter condition (i.e., where the drill string is slowly rotating) is shown in FIGS. 5A, 5B and 5C wherein the curves 72 and 74 show the intensities of the x and y components of the magnetic field and line 76 of FIG. 5C shows the constant value of the component of the magnetic field in the z direction.

As the turbine shaft rotates, the field induced by magnet 66 (i.e., the magnetic field lines) will superimpose a field on the earth's magnetic field which will be sensed by the magnetometer windings. The x and y magnetometer windings 56A and 56B will register an oscillatory field superimposed on the earth's magnetic field. That oscillatory field is indicated schematically at curve 78 in FIG. 5A and at curve 80 in FIG. 5B. No oscillating imposed field will be registered at z axis magnetometer winding 56C, and hence no imposed field will appear on output 76 of FIG. 5C, since the symmetry of magnet 66 relative to the z axis insures that the field induced by magnet 66 will have no z component. The superimposed fields represented by curves 78 and 80 will be sinusoidal in nature and will be out of phase with each other by 90°. These superimposed field signals will be in a frequency range of an order of magnitude or more greater than the frequency range of the normal magnetometer outputs such as represented by curve 72 and 74. Thus, the normal magnetometer output representative of the earth's magnetic field and the superimposed signal for magnet 66 can easily be separated and filtered by standard electronic filtering apparatus and techniques. The frequency of the superimposed field represented by curves 78 and 80 will, of course, be commensurate with the speed of rotation of magnet 66, and hence commensurate with the speed of rotation of turbine shaft 64.

Figure 6C:
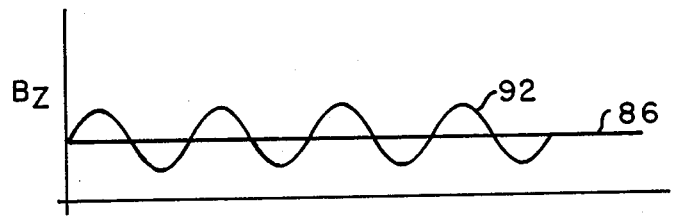
FIGS. 6A, 6B and 6C are plots of the unfiltered outputs of the x, y and z magnetometers during a "kick off" using a bent sub to change drilling angle.
Figure 6B:
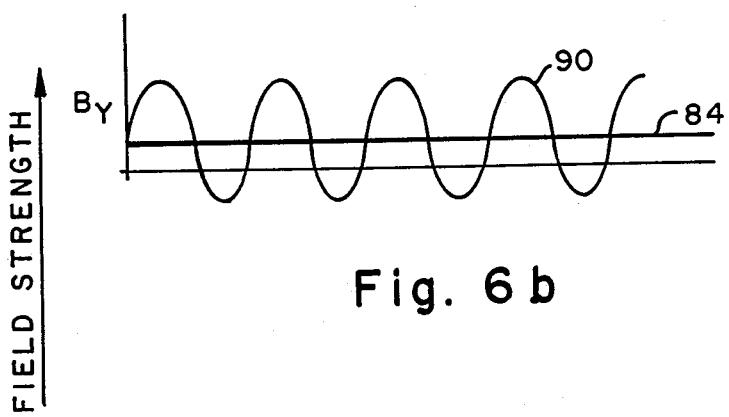
Figure 6A:
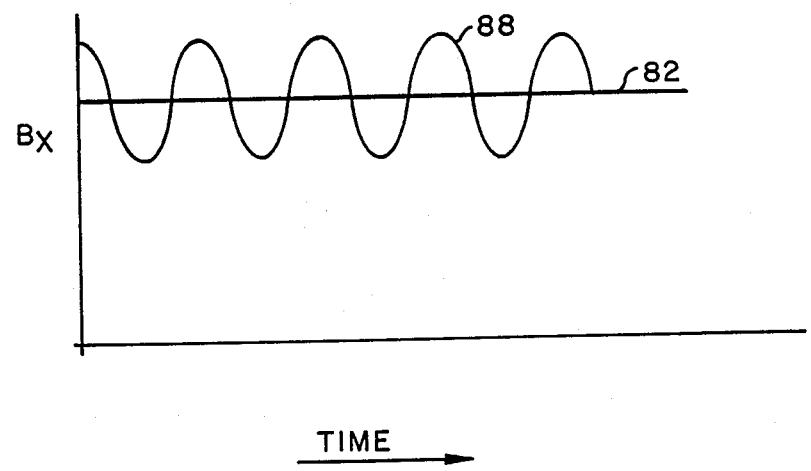

FIGS. 6A, 6B and 6C show plots of the same general type as FIGS. 5A, 5B and 5C for a drilling embodiment employing a "bent sub". In such an embodiment, the drill string does not rotate. Hence, the magnetometer outputs representing the x, y and z components of the earth's magnetic field are the straight lines 82, 84 and 86, respectively. The sinusoidal signals representing the superimposed magnetic field from magnet 66 when the x and y magnetometer windings are indicated at curves 88 and 90. Also, since there is a bend in the sub between the sensor package and the drill bit, a superimposed field is also registered on the z magnetometer winding, that superimposed field being represented by curve 92. In the embodiment represented by the curves of FIG. 6, as with the embodiment represented by the curves of FIG. 5, the frequency of any of the curves 88, 90 or 92 will be commensurate with the speed of rotation of magnet 66 and hence of turbine shaft 64.

Figure 4:
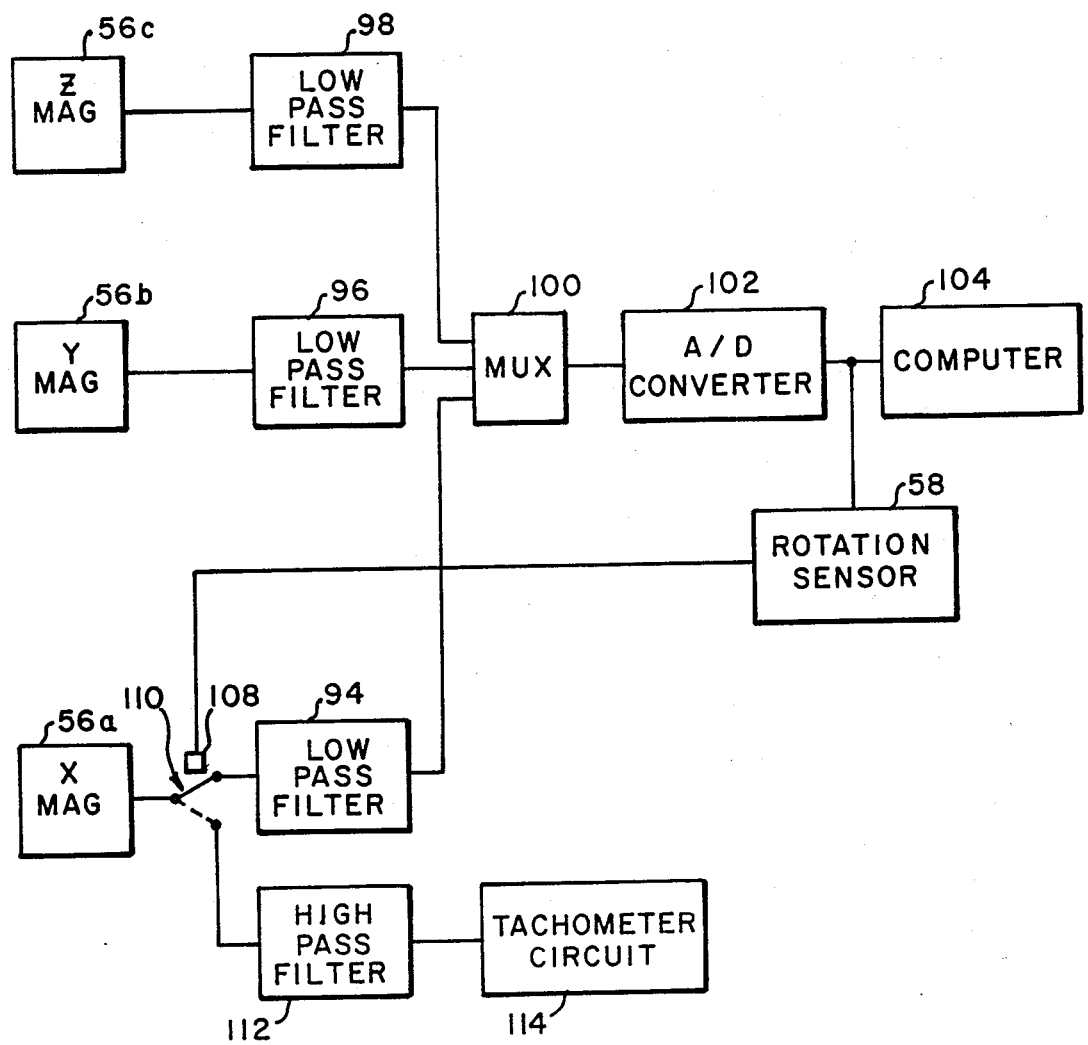
FIG. 4 is an electronic block diagram of the tachometer components and system of the present invention and their interaction with the directional components.

In order to make use of the superimposed field signals to determine the speed of rotation of the turbine shaft, the function of sensing the earth's magnetic field and the function of sensing the rotational speed of the turbine are separated from each other; and the signals must be filtered from each other to prevent them from interfering with or degrading each other. A schematic representation of a system for accomplishing this is shown in FIG. 4. The x, y and z magnetometer windings 56A, 56B and 56C are connected, respectively to low pass filters 94, 96 and 98. When the sensor package is sensing and generating signals commensurate with the earth's magnetic field, the low pass filters 94, 96 and 98 will filter out the high frequency signals commensurate with turbine rotation speed and will pass only the signals commensurate with the values of the components of the earth's magnetic field (e.g., the signals commensurate with curves 72, 74 and 76 of FIGS. 5 or the signals commensurate with lines 82, 84 and 86 of FIGS. 6. The filtered outputs from these low pass filters are then delivered to a multiplexer 100 and then to an analog to digital convertor 102, and thence to the apparatus and circuitry, indicated generally as computer 104, to generate operating signals for valve driver 57 to operate plunger 56 to generate mud pulse signals which are transmitted to and sensed at the surface. In accordance with the present invention, a rotation sensor 58 is employed to switch the system between a first mode (just previously described) in which the earth's magnetic field is being measured and a second mode in which the turbine rotation speed is being measured. Rotation sensor 58 may be the rotation sensor of U.S. Pat. No. 4,013,945 which generates different levels of output signals depending on whether or not the drill string is rotating. When the drill string is not rotating, the output signal from rotation sensor 58 will, as described in U.S. Pat. No. 4,013,945, deliver an output signal to arm the apparatus 104 for operation. That output signal will also be delivered to a relay or other control mechanism 108 which controls a switch 110 to connect magnetometer 56A to low pass filter 94. Thus, when rotation has ceased and it is desired to sense the directional parameters and transmit them to the surface, rotation sensor 58 operates, as in U.S. Pat. No. 4,013,945, to arm the system to receive and process the signals. When rotation is resumed, the output signal from rotation sensor 58 changes to a second level wherein switch 110 is in the dashed line position shown in FIG. 4 to disconnect magnetometer 56A from low pass filter 94 and connect magnetometer 56A to a high pass filter 112. The high pass filter 112 filters out the low frequency signal commensurate with the x component of the earth's magnetic field (i.e., curve 72 of FIG. 5A). The output from high pass filter 112 is then a signal commensurate with sinusoidal curve 78 of FIG. 5A and is, therefore, a measure of and commensurate with the speed of rotation of shaft 64 of turbine 52. That output signal is then delivered to a tachometer circuit where it is appropriately processed and generates control signals to operate valve driver 57 to operate plunger 56 to generate mud pulse signals commensurate with the speed of rotation of turbine 52. Those mud pulse signals are, of course, transmitted to the surface in the mud column and detected at the surface by any suitable detection apparatus, such as, for example, that disclosed in U.S. Pat. No. 4,013,945 or in any other commercially available apparatus. Thus, the driller then has available to him the actual speed of rotation of turbine 52, and the driller can adjust the speed of the turbine as may be desired to meet drilling requirements.

It will be noted that in the arrangement of FIG. 4 the tachometer circuit 114 is connected only to the x magnetometer. It is only necessary to connect the tachometer circuit to any one of the magnetometers which will register the superimposed rotational signal. It is not necessary to monitor the rotational signal at all of the magnetometers, since a signal at any one magnetometer is commensurate with rotational speed of the turbine.

It is also to be noted that in a system, such as is graphically represented in FIG. 6, where the drill string does not rotate, rotation sensor 58 may be replaced by any convenient switch control which operates on a time base or any other selected basis. That switch control will then switch between the first mode in which the system operates to sense and measure the earth's magnetic field and the second mode in which the system operates to sense and measure the speed of rotation of the turbine.

It is to be understood that the system shown in FIG. 4 is shown merely by way of illustration. Any other signal processing system for receiving and processing the signals to be distinguished may be employed.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for measuring the speed of a rotating element downhole in a well, including:
    magnetometer means for normally sensing at least a component of the earth's magnetic field and generating a first signal commensurate therewith;
    a rotating element, the speed of rotation of which is to be measured;
    magnet means on said rotating element and positioned to superimpose a rotating magnetic field on the earth's magnetic field, a frequency related parameter of said superimposed magnetic field being commensurate with the speed of rotation of said rotating element;
    said magnetometer means sensing the rotating magnetic field superimposed on the earth's magnetic field and generating a second signal which varies commensurate with said frequency related parameter; and
    processing means for distinguishing said frequency related parameter of said second signal from said first signal to determine the speed of rotation of said rotating element.

2. The apparatus of claim 1 wherein:
    said rotating element has a central shaft defining an axis of rotation; and
    said magnet means is mounted on said shaft with its magnetic moment perpendicular to said axis.

3. The apparatus of claim 2 including:
    insulating means to magnetically isolate said magnet means from said shaft.

4. The apparatus of claim 1 wherein:
    said magnet means has an energy product of about 15 to 20 megagauss-oersteds.

5. The apparatus of claim 1 wherein:
    said magnet means is suitable for use in an environment of high vibration and temperature of 150° C.

6. The apparatus of claim 1 wherein:
    said magnet means is a rare earth magnet.

7. The apparatus of claim 1 wherein:
    said magnet means is enclosed in a protective casing.

8. The apparatus of claim 1 wherein:
    said magnet means is enclosed in a protective casing of streamlined profile which contains a shock absorbing material.

9. The apparatus of claim 1 wherein said apparatus is contained in a drill string segment and wherein:
    said magnetometer means mounted on the axis of said drill string segment; and
    said rotating element rotates on an axis of rotation coaxial with the axis of the drill string segment.

10. The apparatus of claim 9 wherein:
    said rotating means has a central rotating shaft coaxial with said axis of said drill string segment; and
    said magnetic means is mounted on said rotating shaft with its magnetic moment perpendicular to the axis of said rotating shaft.

11. The apparatus of claim 10 including:
    insulating means to magnetically isolate said magnet means from said shaft.

12. Apparatus for measuring the speed of rotation of a turbine downhole in a well in a drill string, including:
    magnetometer means in the drill string for normally sensing at least a component of the earth's magnetic field and generating a first signal commensurate with a directional parameter of the drill string;
    turbine means in said drill string having a central shaft defining the axis of rotation;
    magnet means on said turbine shaft and positioned to interact with said magnetometer means, said magnet means superimposing a rotating magnetic field on the earth's magnetic field, the frequency of said rotating magnetic field being commensurate with the speed of rotation of said turbine
    said magnetometer means sensing the rotating magnetic field superimposed on the earth's magnetic field and generating a second signal which varies in frequency commensurate with the speed of rotation of said turbine; and
    processing means for separating said first and second signals and determining the frequency of said second signal to determine the speed of rotation of said turbine.

13. The apparatus of claim 12 wherein:
    said magnet means is mounted on said turbine shaft with its magnetic moment perpendicular to said turbine axis.

14. The apparatus of claim 13 including:
    insulating means to magnetically isolate said magnet means from said shaft.

15. The apparatus of claim 12 wherein:
    said magnet means has an energy product of about 15 to 20 megagauss-oersteds.

16. The apparatus of claim 12 wherein:
    said magnet means is suitable for use in an environment of high vibration and temperature of 150° C.

17. The apparatus of claim 12 wherein:
    said magnet means is a rare earth magnet.

18. The apparatus of claim 12 wherein:
    said magnet means is enclosed in a protective casing.

19. The apparatus of claim 12 wherein:
said magnet means is enclosed in a protective casing of streamlined profile which contains a shock absorbing material.

20. The apparatus of claim 12 wherein:
said magnetometer means is triaxial magnetometer means mounted on an axis of said drill string and a "z" axis along the axis of the drill string and "x" and "y" axes mutually perpendicular to each other and to said "z" axis; and
said magnetic field from said magnet means is superimposed on at least the signals from the "x" and "y" axes of said magnetometer means.

21. The apparatus of claim 12 including:
rotation sensor means for enabling said processing means in accordance with the state of rotation of the drill string.

22. The apparatus of claim 1 wherein:
said frequency related parameter is the frequency of rotation of said rotating magnetic field.

23. The apparatus of claim 22 wherein:
said rotating element has a central shaft defining an axis of rotation; and
said magnet means is mounted on said shaft with its magnetic moment perpendicular to said axis.

24. The apparatus of claim 23 including:
insulating means to magnetically isolate said magnetic means from said shaft.

25. The apparatus of claim 22 wherein:
said magnet means has an energy product of about 15 to 20 magagauss-oersteds.

26. The apparatus of claim 22 wherein:
said magnet means is suitable for use in an environment of high vibration and temperature of 150° C.

27. The apparatus of claim 22 wherein:
said magnet means is a rare earth magnet.

28. The apparatus of claim 22 wherein:
said magnet means is enclosed in a protective casing.

29. The apparatus of claim 22 wherein:
said magnet means is enclosed in a protective casing of streamlined profile which contains a shock absorbing material.

30. The apparatus of claim 22 wherein said apparatus is contained in a drill string segment and wherein:
said magnetometer means mounted on the axis of said drill string segment; and
said rotating element rotates on an axis of rotation coaxial with the axis of the drill string segment.

31. The apparatus of claim 30 wherein:
said rotating element has a central rotating shaft coaxial with said axis of said drill string segment; and
said magnetic means is mounted on said rotating shaft with its magnetic moment perpendicular to the axis of said rotating shaft.

32. The apparatus of claim 31 including:
insulating means to magnetically isolate said magnet means from said shaft.

* * * * *